United States Patent
Riggin, III

(10) Patent No.: US 10,007,399 B2
(45) Date of Patent: Jun. 26, 2018

(54) INFORMATION BLOCK USER INTERFACE

(71) Applicant: Verizon Patent and Licensing Inc., Arlington, VA (US)

(72) Inventor: John Walter Riggin, III, Stow, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 408 days.

(21) Appl. No.: 14/705,230

(22) Filed: May 6, 2015

(65) Prior Publication Data
US 2016/0328095 A1 Nov. 10, 2016

(51) Int. Cl.
*G06F 3/048* (2013.01)
*G06F 3/0482* (2013.01)
*G06F 3/0484* (2013.01)
*G06F 3/0481* (2013.01)

(52) U.S. Cl.
CPC ........ *G06F 3/0482* (2013.01); *G06F 3/04815* (2013.01); *G06F 3/04842* (2013.01); *G06F 3/04845* (2013.01)

(58) Field of Classification Search
CPC ......... G06F 2203/04802; G06F 3/0482; G06F 3/04815; G06F 3/04842; G06F 3/04845
See application file for complete search history.

(56) References Cited

U.S. PATENT DOCUMENTS

| | | | | |
|---|---|---|---|---|
| 5,303,388 A | * | 4/1994 | Kreitman | G06F 3/04815 715/836 |
| 5,515,486 A | * | 5/1996 | Amro | G06F 3/04815 345/419 |
| 5,963,215 A | * | 10/1999 | Rosenzweig | G06F 3/04815 345/649 |
| 6,466,237 B1 | * | 10/2002 | Miyao | G06F 3/0483 707/E17.029 |
| 7,917,868 B2 | * | 3/2011 | Ok | G06F 3/04815 345/419 |
| 8,132,120 B2 | | 3/2012 | Stallings et al. | |
| 8,677,277 B2 | | 3/2014 | Stallings et al. | |
| 2001/0028369 A1 | * | 10/2001 | Gallo | G06F 3/04815 715/848 |
| 2001/0040571 A1 | * | 11/2001 | Miller | G06F 3/04815 345/419 |
| 2002/0069415 A1 | * | 6/2002 | Humbard | G06F 3/04815 725/52 |

(Continued)

*Primary Examiner* — Dino Kujundzic

(57) ABSTRACT

A device may display a user interface that includes multiple information blocks. The multiple information blocks may comprise multiple corresponding first panels, multiple corresponding second panels, and multiple corresponding third panels. The user interface may include the multiple corresponding first panels. The device may detect a user interaction associated with a first panel of the multiple corresponding first panels. The first panel may be associated with an information block of the multiple information blocks. The user interaction may indicate that a second panel of the information block is to be displayed. The second panel may be associated with the information block and may be one of the multiple corresponding second panels. The device may display, based on the user interaction, an updated user interface that includes the second panel of the information block.

20 Claims, 16 Drawing Sheets

(56) References Cited

U.S. PATENT DOCUMENTS

| | | | | |
|---|---|---|---|---|
| 2003/0112279 | A1* | 6/2003 | Irimajiri | G06F 3/0482 |
| | | | | 715/810 |
| 2003/0156146 | A1* | 8/2003 | Suomela | G06F 3/0481 |
| | | | | 715/864 |
| 2006/0020898 | A1* | 1/2006 | Kim | G06F 3/04815 |
| | | | | 715/764 |
| 2007/0028187 | A1* | 2/2007 | Katsuyama | G06F 3/04886 |
| | | | | 715/810 |
| 2007/0124699 | A1* | 5/2007 | Michaels | G06F 3/0482 |
| | | | | 715/837 |
| 2008/0266289 | A1* | 10/2008 | Park | G06F 3/0482 |
| | | | | 345/419 |
| 2009/0187862 | A1* | 7/2009 | DaCosta | G06F 3/0482 |
| | | | | 715/836 |
| 2010/0315417 | A1* | 12/2010 | Cho | G06F 1/1616 |
| | | | | 345/419 |
| 2013/0346911 | A1* | 12/2013 | Sripada | G06F 3/0488 |
| | | | | 715/782 |
| 2014/0123071 | A1* | 5/2014 | Ruotsalainen | G06F 3/04815 |
| | | | | 715/836 |
| 2014/0228119 | A1* | 8/2014 | Koenig | A63F 13/12 |
| | | | | 463/32 |
| 2015/0317058 | A1* | 11/2015 | Babarykin | G06F 3/04815 |
| | | | | 715/765 |

\* cited by examiner

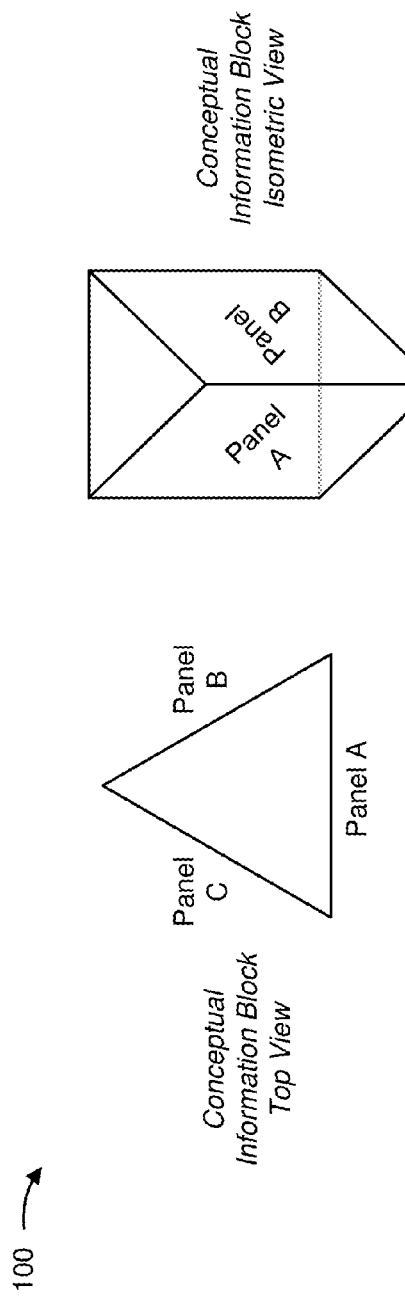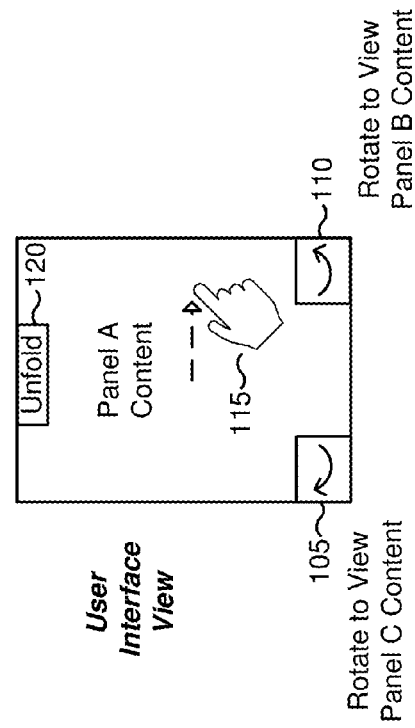
FIG. 1A
FIG. 1B

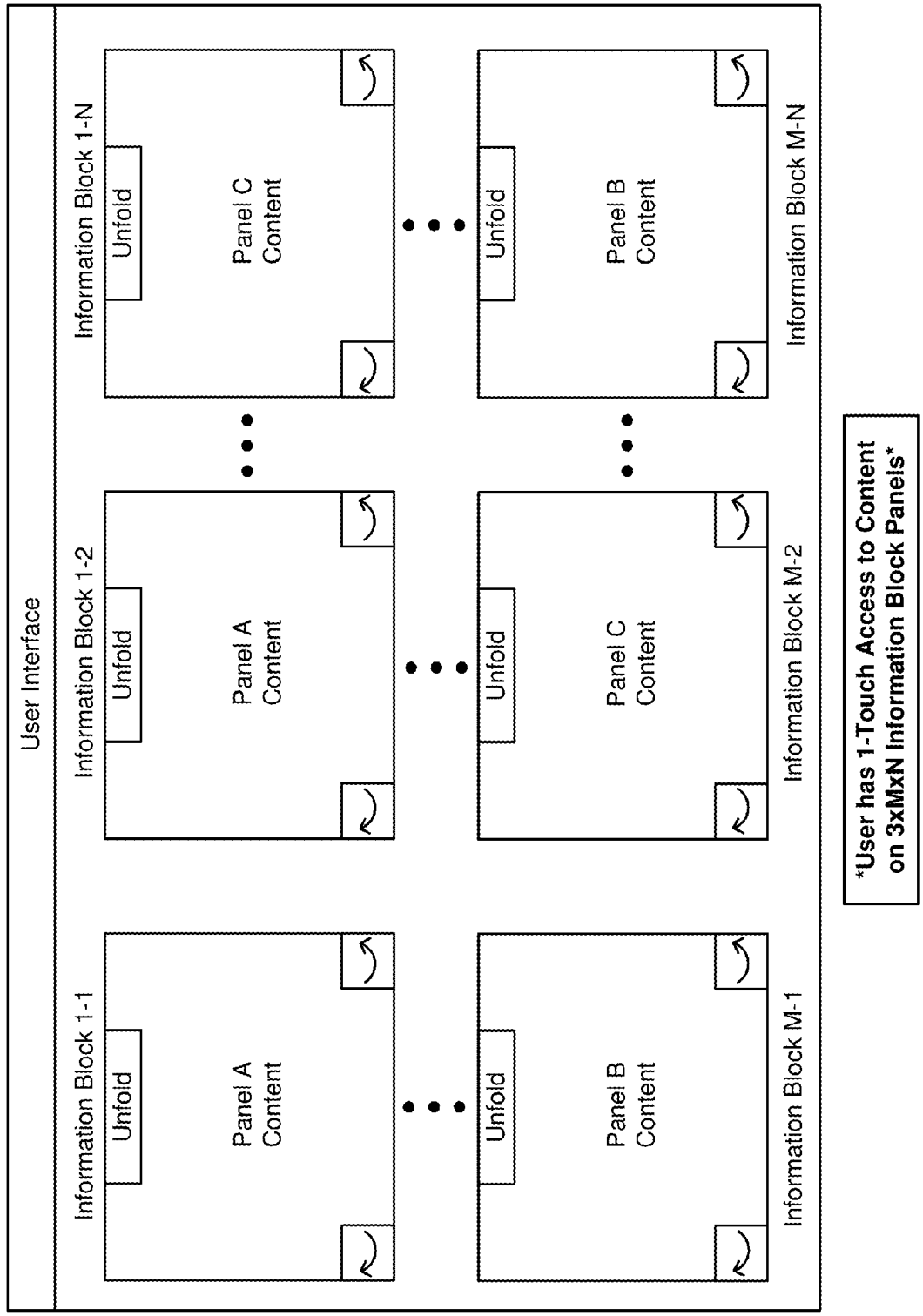

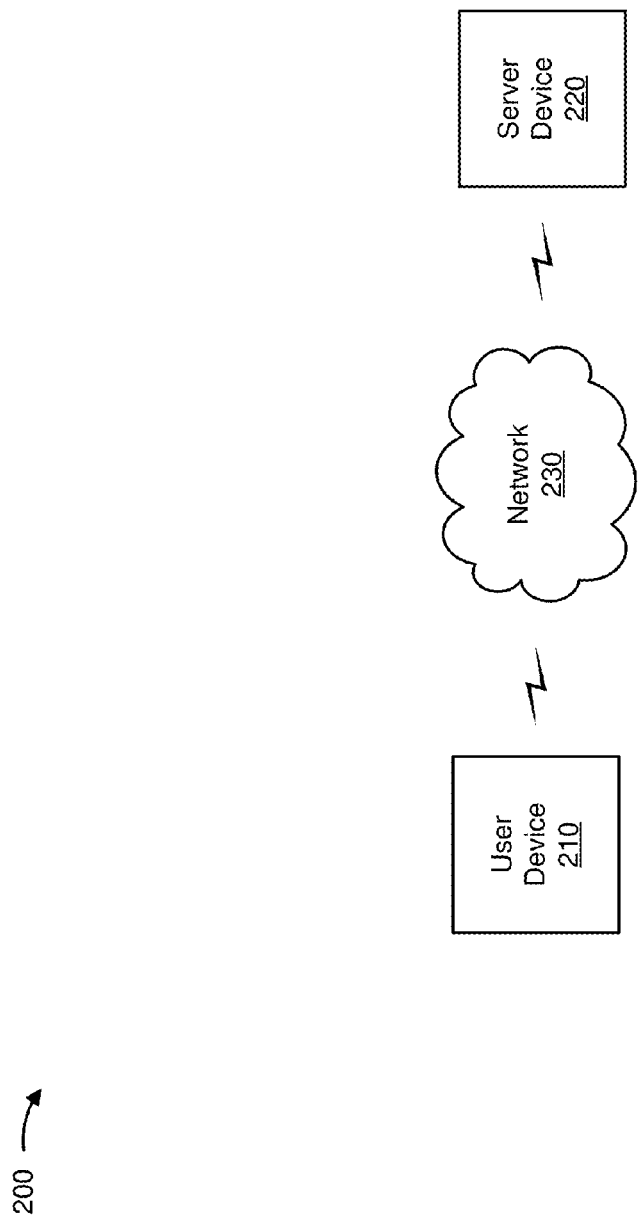

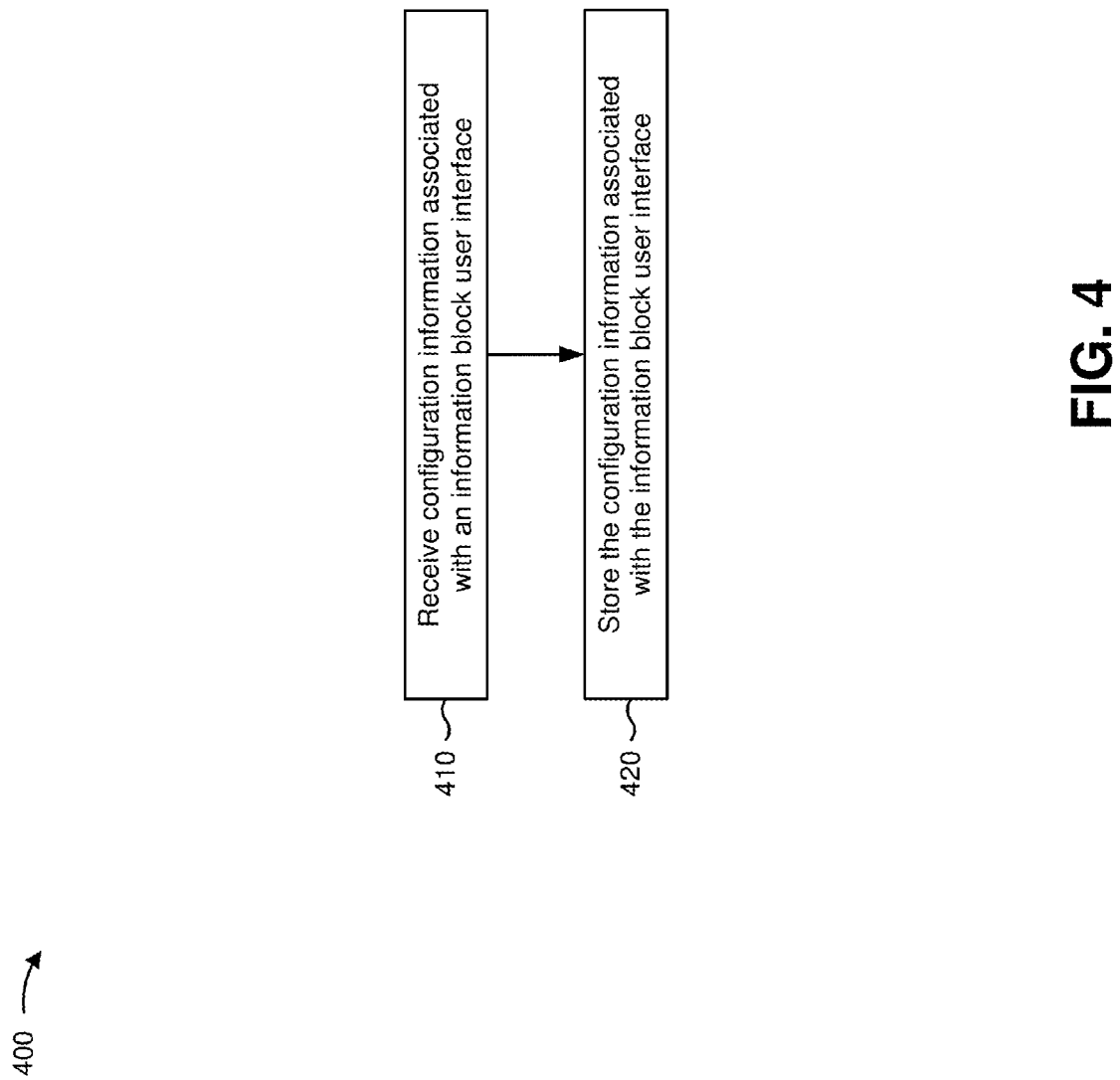

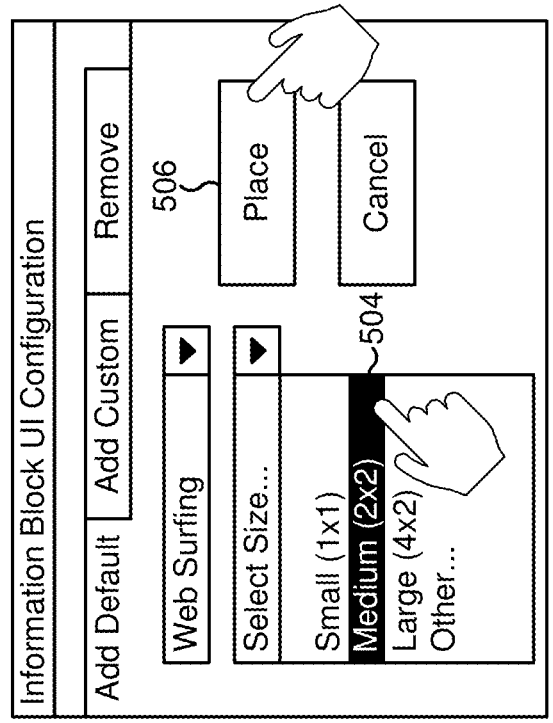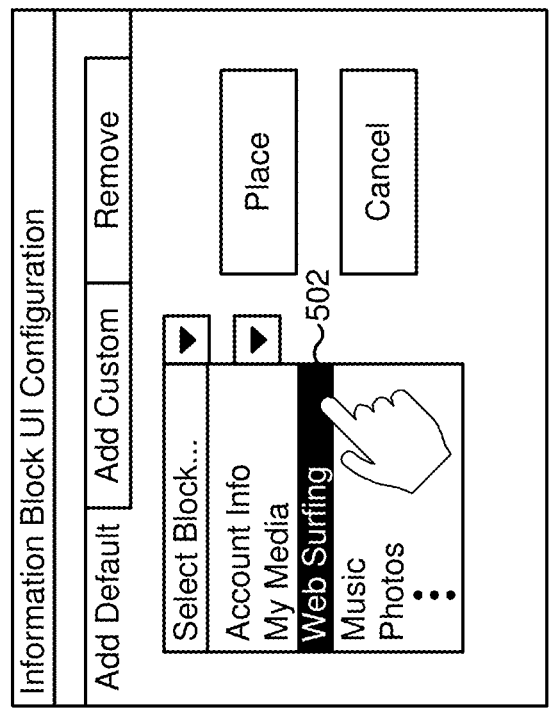
FIG. 5B
FIG. 5A

INFORMATION BLOCK USER INTERFACE

BACKGROUND

A user may interact with a user device (e.g., a mobile phone, a smart phone, a tablet, a laptop computer, a desktop computer, etc.) via a user interface. A typical user interface may include various input elements that allow the user to interact with the user device, such as menus, windows, icons, buttons, text boxes, command lines, or the like.

BRIEF DESCRIPTION OF THE DRAWINGS

FIGS. 1A-1C are diagrams of an overview of an example implementation described herein;

FIG. 2 is a diagram of an example environment in which systems and/or methods, described herein, may be implemented;

FIG. 4 is a flow chart of an example process for receiving and storing configuration information associated with an information block user interface;

FIGS. 5A-5F are diagrams of an example implementation relating to the example process shown in FIG. 4;

DETAILED DESCRIPTION OF PREFERRED EMBODIMENTS

Figure 3:
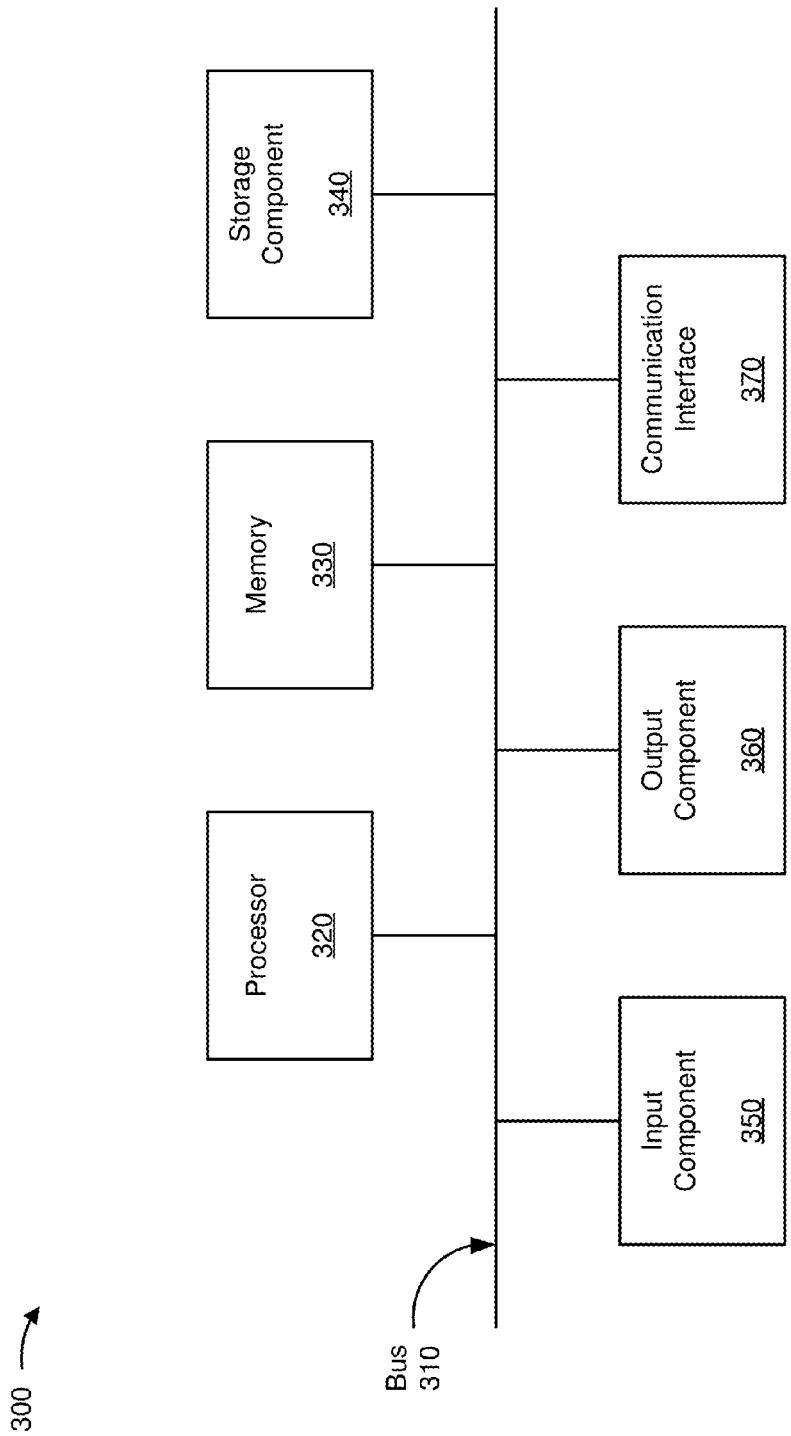
FIG. 3 is a diagram of example components of one or more devices of FIG. 2.

The following detailed description of example implementations refers to the accompanying drawings. The same reference numbers in different drawings may identify the same or similar elements.

A user interface, displayed by a user device, may provide a user with access to an ever-increasing amount and/or variety of content (e.g., applications, services, media content, web pages, documents, etc.). As the amount and variety of such content increases, the need for the user interface to efficiently provide the user with access to the content becomes important in order to maintain a positive user experience (e.g., such that the user may access the content easily, quickly, in relatively few gestures, etc.). Furthermore, a need for the user interface to be user configurable increases (e.g., such that the user may configure the user interface based on preferences of the user). Moreover, a service provider, associated with the user device, may wish for the user interface to provide a unified user experience across the content (e.g., such that the user accesses multiple items of content in a similar manner). Implementations described herein may provide a configurable user interface that includes one or more information blocks designed to efficiently provide a user with access to content associated with the user device (e.g., such that the user may access the content in one gesture or less, such that a user experience associated with accessing the content is unified across the content).

FIGS. 1A-1C are diagrams of an overview of an example implementation 100 described herein. For the purposes of example implementation 100, assume that the user device is capable of displaying a set of information blocks via a user interface associated with the user device, and that the information blocks may be configured to display content accessible by the user device.

FIG. 1A shows diagrams of an example conceptual information block. As shown, the information block may be conceptually described as a three-dimensional object (e.g., a triangular prism), where each panel of a set of panels (e.g., three panels corresponding to three surfaces connecting a first triangle of the triangular prism to a second triangle of the triangular prism) may be configured to display content. For example, the information block may be configured to display first content (e.g., panel A content) on a first panel (e.g., panel A), second content (e.g., panel B content) on a second panel (e.g., panel B), and third content (e.g., panel C content) on a third panel (e.g., panel C). While implementations described herein are described in the context of information blocks in the form of triangular prisms, in some implementations, the information block may be conceptually described as another type of object, such as a cylinder (e.g., where a surface of the cylinder is divided into panels), a circle (e.g., where the circle is divided into panels) or another type of object that may be configured to include multiple panels.

FIG. 1B shows a diagram of an example view of an information block as displayed via a user interface associated with displaying a set of information blocks (herein referred to as an information block user interface). As shown, the information block user interface may display content associated with one panel (e.g., the panel A content) of the information block. As shown by reference number 105, the information block may include a first input element (e.g., an arrow, a button, etc.) that, when selected by the user, may cause the information block to rotate such that the panel C content is displayed (e.g., rather than the panel A content). Similarly, as shown by reference number 110, the information block may include a second input element that, when selected by the user, may cause the information block to rotate such that the panel B content is displayed (e.g., rather than the panel A content). Panel B and panel C may include similar input elements associated with rotating the information block (e.g., panel B may include input elements that allow the information block to be rotated to display panel A and panel C, and panel C may include input elements that allow the information block to be rotated to display panel A and panel B). As shown by reference number 115, the information block may also be rotated based on a swipe gesture, provided by the user (e.g., from left to right, from right to left, etc.), in order to view panel content associated with another panel. As shown by reference number 120, the information block may also include a third input element that, when selected by the user, may cause the information block to be unfolded (e.g., such that the panel A content, the panel B content, and the panel C content are concurrently displayed in a row, concurrently displayed in a column, etc.). Notably, each panel of the information block that is not displayed (e.g., panel B and panel C are not displayed when panel A is displayed) is accessible in one gesture (e.g., panel B or panel C may be accessed in a single gesture associated with panel A).

FIG. 1C shows a diagram of an example user interface that includes a set of information blocks designed as described above with regard to FIGS. 1A and 1B. As shown, the information block user interface may include one to M (M≥1) rows of information blocks and one to N (N≥1) columns of information blocks. In some implementations, the number of rows and/or columns of information blocks may be configurable and/or may depend on a size of display screen associated with the information block user interface.

As shown, each information block may include the input elements associated with rotating and unfolding the information block (e.g., as described above). As such, the user may efficiently (e.g., in one gesture or less) access content configured for display on 3×M×N information block panels (e.g., since each information block includes three panels). Moreover, a user experience, associated with accessing the content, may be unified (e.g., since the content displayed by each information block panel may be accessed in a similar manner). In this way, an information block user interface may include a set of information blocks that allow the user to efficiently access content configured for display via the set of information blocks.

In some implementations, the information blocks and/or the information block user interface may be configurable. For example, the user may create a new information block to be added to the information block user interface, add a predefined and/or default information block to the information block user interface, remove an information block from the information block user interface, modify content displayed on a panel of an information block, or the like. As another example, the user may select and/or modify a size of an information block (e.g., such that the information block user interface may include information blocks of different sizes) and/or a location of the information block within the information block user interface.

FIG. 2 is a diagram of an example environment 200 in which systems and/or methods, described herein, may be implemented. As shown in FIG. 2, environment 200 may include a user device 210, a server device 220, and a network 230. Devices of environment 200 may interconnect via wired connections, wireless connections, or a combination of wired and wireless connections.

User device 210 may include one or more devices capable of receiving, generating, storing, processing, and/or providing information associated with an information block user interface. For example, user device 210 may include a communication and/or computing device, such as a mobile phone (e.g., a smart phone, a radiotelephone, etc.), a laptop computer, a desktop computer, a tablet computer, a handheld computer, a gaming device, a wearable communication device (e.g., a smart wristwatch, a pair of smart eyeglasses, etc.), a set-top box, or a similar type of device. In some implementations, user device 210 may receive information from and/or transmit information to another device in environment 200.

Server device 220 may include one or more devices capable of receiving, storing, and/or providing configuration information associated with an information block user interface. In some implementations, server device 220 may include a communication interface that allows server device 220 to receive information from and/or transmit information to other devices in environment 200, such as user device 210.

Network 230 may include one or more wired and/or wireless networks. For example, network 230 may include a cellular network (e.g., a long-term evolution (LTE) network, a 3G network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

FIG. 3 is a diagram of example components of a device 300. Device 300 may correspond to user device 210 and/or server device 220. In some implementations, user device 210 and/or server device 220 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 may include a component that permits communication among the components of device 300. Processor 320 is implemented in hardware, firmware, or a combination of hardware and software. Processor 320 may include a processor (e.g., a central processing unit (CPU), a graphics processing unit (GPU), an accelerated processing unit (APU), etc.), a microprocessor, and/or any processing component (e.g., a field-programmable gate array (FPGA), an application-specific integrated circuit (ASIC), etc.) that interprets and/or executes instructions. Memory 330 may include a random access memory (RAM), a read only memory (ROM), and/or another type of dynamic or static storage device (e.g., a flash memory, a magnetic memory, an optical memory, etc.) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 350 may include a component that permits device 300 to receive information, such as via user input (e.g., a touch screen display, a keyboard, a keypad, a mouse, a button, a switch, a microphone, etc.). Additionally, or alternatively, input component 350 may include a sensor for sensing information (e.g., a global positioning system (GPS) component, an accelerometer, a gyroscope, an actuator, etc.). Output component 360 may include a component that provides output information from device 300 (e.g., a display, a speaker, one or more light-emitting diodes (LEDs), etc.).

Communication interface 370 may include a transceiver-like component (e.g., a transceiver, a separate receiver and transmitter, etc.) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

FIG. 4 is a flow chart of an example process 400 for receiving and storing configuration information associated with an information block user interface. In some implementations, one or more process blocks of FIG. 4 may be performed by user device 210. In some implementations, one or more process blocks of FIG. 4 may be performed by another device or a set of devices separate from or including user device 210, such as server device 220.

As shown in FIG. 4, process 400 may include receiving configuration information associated with an information block user interface (block 410). For example, user device 210 may receive configuration information associated with an information block user interface. In some implementations, user device 210 may receive the configuration information when a user of user device 210 provides user input associated with the configuration information. Additionally, or alternatively, user device 210 may receive the configuration information when another device provides the information, such as server device 220.

The configuration information may include information that describes a user interface associated with displaying content via a set of information blocks. For example, the configuration information may include information that describes content that is to be displayed via an information block of the set of information blocks. In some implementations, the content may include information associated with a service accessible by user device 210 (e.g., a service associated with managing a service provider account, a service associated with monitoring and/or managing data usage and/or minute usage, etc.), an application stored or accessible by user device 210 (e.g., a social media application, a gaming application, a home control application, a music application, a television application, a movie application, a reading application, a calendar application, a web browsing application, a weather application, a photo application, a shopping application, a map application, etc.), a document stored or accessible by user device 210 (e.g., a text document, an image document, a spreadsheet document, etc.), user generated content (e.g., a user generated application, a user generated document, etc.), a control element associated with user device 210 (e.g., a hyperlink, a radio button, a drop-down menu, a button, a text box, etc.), or the like. In some implementations, the configuration information may identify a portion of the information block via which the content is to be displayed (e.g., a first panel, a second panel, a third panel, etc.). In some implementations, a single portion of the information block may include one or more items of content (e.g., the first panel may be configured to display a maps application and a text document).

Additionally, or alternatively, the configuration information may include information that describes a location on the user interface at which the information block is to be displayed. For example, the configuration information may include information indicating that the information block is to be displayed in a top left portion of the information block user interface, a center portion of the information block user interface, a particular position in a grid associated with the information block user interface, adjacent (e.g., above, below, to the left, to the right, etc.) of another information block, or the like.

Additionally, or alternatively, the configuration information may include information that describes a size of the information block. For example, the configuration information may include information that identifies a relative size of the information block (e.g., small, medium, large, etc.), a grid-size of the information block (e.g., 1 row by 2 columns, 2 rows by 2 columns, etc.), a pixel size associated with the information block (e.g., a width in pixels, a height in pixels, etc.), or the like. As a particular example, assume that a display screen, associated with user device 210, is capable of displaying a quantity of M×N information blocks in a grid configuration (e.g., where a smallest information block size is 1M by 1N). Here, the configuration information may include information indicating the information block is to be the smallest size, or a size that is larger than the smallest size (e.g., 1M by 2N, 3M by 1N, 2M by 2N, etc.). In some implementations, the information block user interface may be scalable based on capabilities of a display screen via which the information block user interface is to be displayed (i.e., a larger screen and/or a screen with a higher resolution may be capable of displaying more information blocks than a relatively smaller screen and/or a screen with a relatively lower resolution).

Additionally, or alternatively, the configuration information may include another type of information, such as a title of the information block, information that identifies a portion of the information block that is to be initially displayed (e.g., information that identifies a panel that is to be displayed before the user interacts with the information block).

In some implementations, the configuration information may include information associated with multiple information blocks (e.g., such that multiple information blocks may be concurrently displayed via the information block user interface). Additionally, or alternatively, the configuration information may include configuration information associated with multiple users (e.g., such that each user is associated with configuration information for a different information block user interface).

In some implementations, user device 210 may receive the configuration information based on user input. For example, user device 210 may provide, for display via a display screen of user device 210, an information block configuration user interface, and the user may provide, via one or more input elements (e.g., buttons, menus, text boxes, etc.), the configuration information. As a particular example, the information block configuration user interface may allow the user to create an information block by indicating (e.g., by clicking and dragging an icon associated with the content, by selecting the content via a browsing window, etc.) that the content is to be displayed on a portion (e.g., a panel) of the information block. Here, when the user is finished creating the information block (e.g., when the user has selected content for each panel of the information block), the user may select (e.g., via a menu, by touching the display screen) a size of the information block and/or the location of the information block. In this way, the information block configuration user interface may allow the user to create, modify, remove, size, position, or the like, one or more information blocks to be displayed via the information block user interface.

As another example, user device 210 may receive the configuration information based on a user gesture associated with the information block user interface. As a particular example, assume that user device 210 provides, for display via the display screen of user device 210, an information block user interface that includes a panel of an information block on a first portion of the information block user interface. Further, assume that user device 210 provides, for display via another portion of the information block user interface that is not associated with the panel, information that represents an item of content (e.g., an icon, a file name, etc.). Here, user device 210 may receive the configuration information based on the user dragging and dropping the information that represents the item of content onto the panel (e.g., to indicate that the item of content is to be displayed on the panel).

Additionally, or alternatively, user device 210 may receive the configuration information based on default and/or predefined configuration information. For example, user device 210 and/or server device 220 may store or have access to configuration information that describes a predefined information block (e.g., an information block created by the service provider and associated with services provided by the service provider). Here, the user may indicate (e.g., by selecting a menu item, by selecting button, etc.) that the information block user interface is to display the predefined information block. In some implementations, user device 210 may (e.g., periodically) receive default and/or predefined configuration information from server device 220 (e.g., once a week, once a month, when a predefined information block is updated, when a default configuration information block is created, etc.). In some implementations, the user may modify the default and/or predefined configuration information via the information block configuration user interface.

In some implementations, user device 210 may receive updated configuration information. For example, user device 210 may receive (e.g., based on user input) configuration information that describes a set of information blocks. Here, the user may modify the configuration information (e.g., when the user modifies an information block, creates a new information block, removes an information block, etc.) to create updated configuration information associated with the set of information blocks.

As further shown in FIG. 4, process 400 may include storing the configuration information associated with an information block user interface (block 420). For example, user device 210 may store the configuration information associated with the information block user interface. In some implementations, user device 210 may store the configuration information after user device 210 receives the configuration information. Additionally, or alternatively, user device 210 may store the configuration information when user device 210 receives information indicating that user device 210 is to store the configuration information from another device, such as server device 220, or from a user of user device 210.

In some implementations, user device 210 may store the configuration information in a memory location (e.g., a RAM, a ROM, a cache, a hard disk, etc.) of user device 210. Additionally, or alternatively, user device 210 may provide the configuration information to another device for storage, such as server device 220.

In some implementations, user device 210 may store information associated with the configuration information such that previous configuration information (e.g., configuration information received by user device 210 at an earlier time) is supplemented, modified, overwritten, deleted, or the like. Additionally, or alternatively, user device 210 may store the configuration information such that user device 210 may retrieve the configuration information at a later time (e.g., in order to provide the information block user interface for display). In some implementations, user device 210 may store the configuration information with respect to a user of user device 210 such that the configuration information may be retrieved based on information that identifies the user of user device 210 (e.g., when there are multiple users of user device 210).

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

FIGS. 5A-5F are diagrams of an example implementation 500 relating to example process 400 shown in FIG. 4. For the purposes of example implementation 500, assume that a user of user device 210 wishes to provide configuration information associated with an information block user interface to be displayed via user device 210, and that user device 210 is providing, for display, a configuration user interface associated with providing the configuration information for the information block user interface.

As shown in FIG. 5A, the information block configuration user interface may include a set of tabs (e.g., an Add Default tab, an Add Custom tab, and a Remove tab) associated with providing the configuration information. As shown by reference number 502, the user may indicate (e.g., via a Select Block drop-down menu on the Add Default tab) that a web surfing information block is to be added to the information block user interface. Here, the web surfing information block may be a predefined information block for which configuration information is stored or accessible by user device 210.

As shown in FIG. 5B, and by reference number 504, the user may indicate (e.g., via a Select Size drop-down menu on the Add Default tab) that the web surfing information block is to be displayed in a medium size (e.g., 2×2). For the purposes of example implementation 500, assume that user device 210 is capable of displaying information blocks in a 4×6 configuration, and that the smallest size of an information block is 1×1. As shown by reference number 506, the user may indicate (e.g., by selecting a Place button), that the user wishes to identify a location at which the web surfing information block is to be displayed.

Figure 5C:
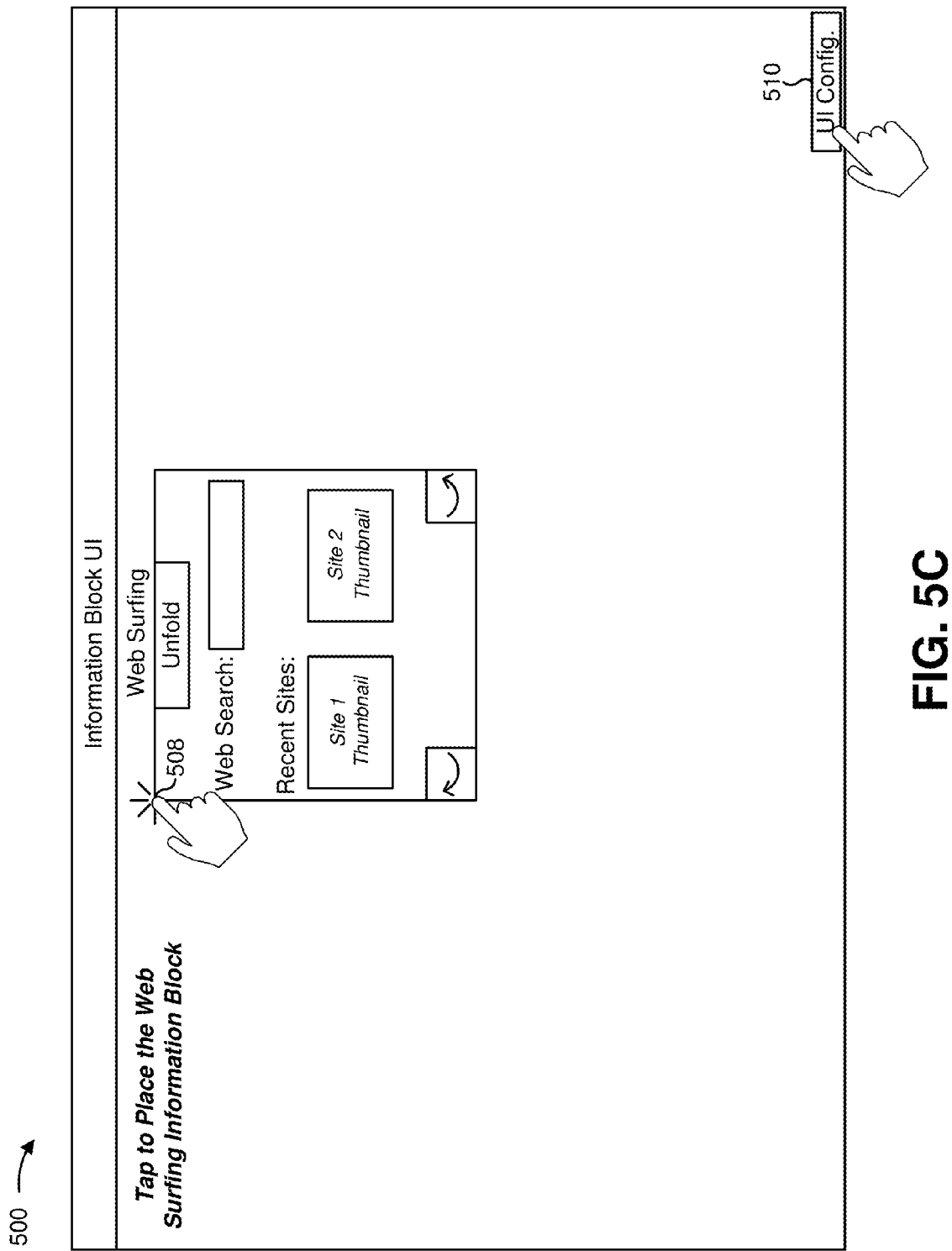

As shown in FIG. 5C, and by reference number 508, the user may identify (e.g., by tapping a display screen of user device 210) the location at which the web surfing information block is to be displayed within the information block user interface (e.g., a top middle portion of the information block user interface). In some implementations, the user may select and drag an information block (e.g., to reposition the information block after the location is selected). As shown by reference number 510, the user may indicate (e.g., by selecting a UI configuration button) that the user wishes to provide additional configuration information associated with the information block user interface.

Figure 5D:
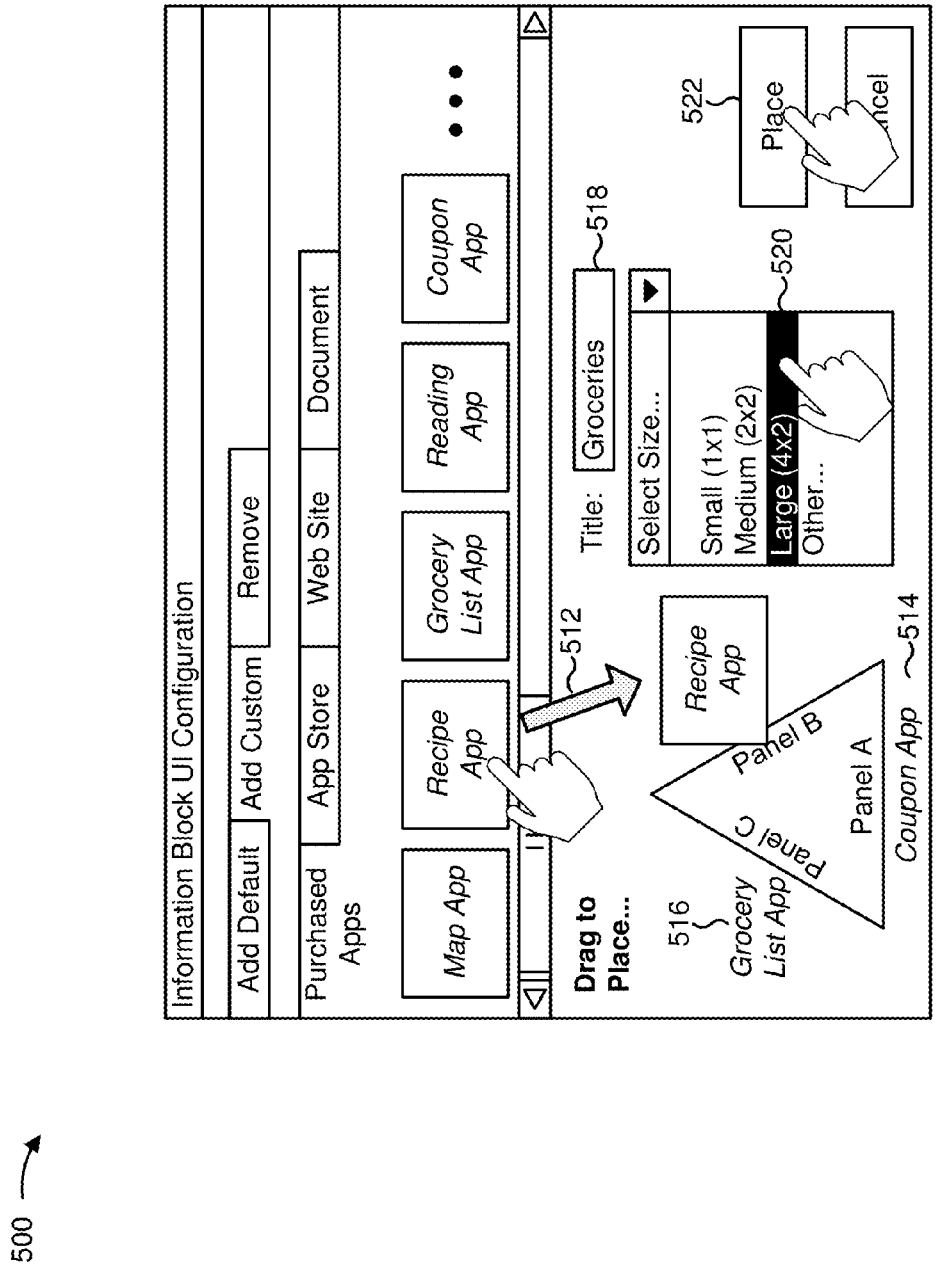

As shown in FIG. 5D, the user may provide configuration information associated with creating an information block (e.g., via the Add Custom tab of the configuration user interface). As shown by reference number 512, the user may indicate that a recipe application, stored or accessible by user device 210, is to be displayed on a particular panel of the user created information block. For example, as shown, user device 210 may display a set of tabs (e.g., a Purchase Apps tab, an App Store tab, a Web Site tab, and a Document tab) associated with content that may be added to the user created information block. Here, as shown, the user may indicate (e.g., by selecting and dragging an icon associated with a recipe application on the Purchased Apps tab) that the recipe application is to be added to a first panel (e.g., panel B) of the user created information block. Similarly, as shown by reference numbers 514 and 516, the user may indicate (e.g., by selecting and dragging respective icons) that a coupon application and a grocery list application are to be displayed on a second panel of the information block (e.g., panel A) and a third panel of the information block (e.g., panel C), respectively.

As shown by reference number 518, the user may also provide (e.g., via a textbox associated with the user created information block) a title (e.g., groceries) associated with the user created information block. As shown by reference number 520, the user may indicate (e.g., via a Select Size drop-down menu) that the user created information block is to be displayed in a large size (e.g., 4×2). As shown by reference number 522, the user may indicate (e.g., by selecting a Place button), that the user wishes to identify a location at which the groceries information block is to be displayed.

Figure 5E:
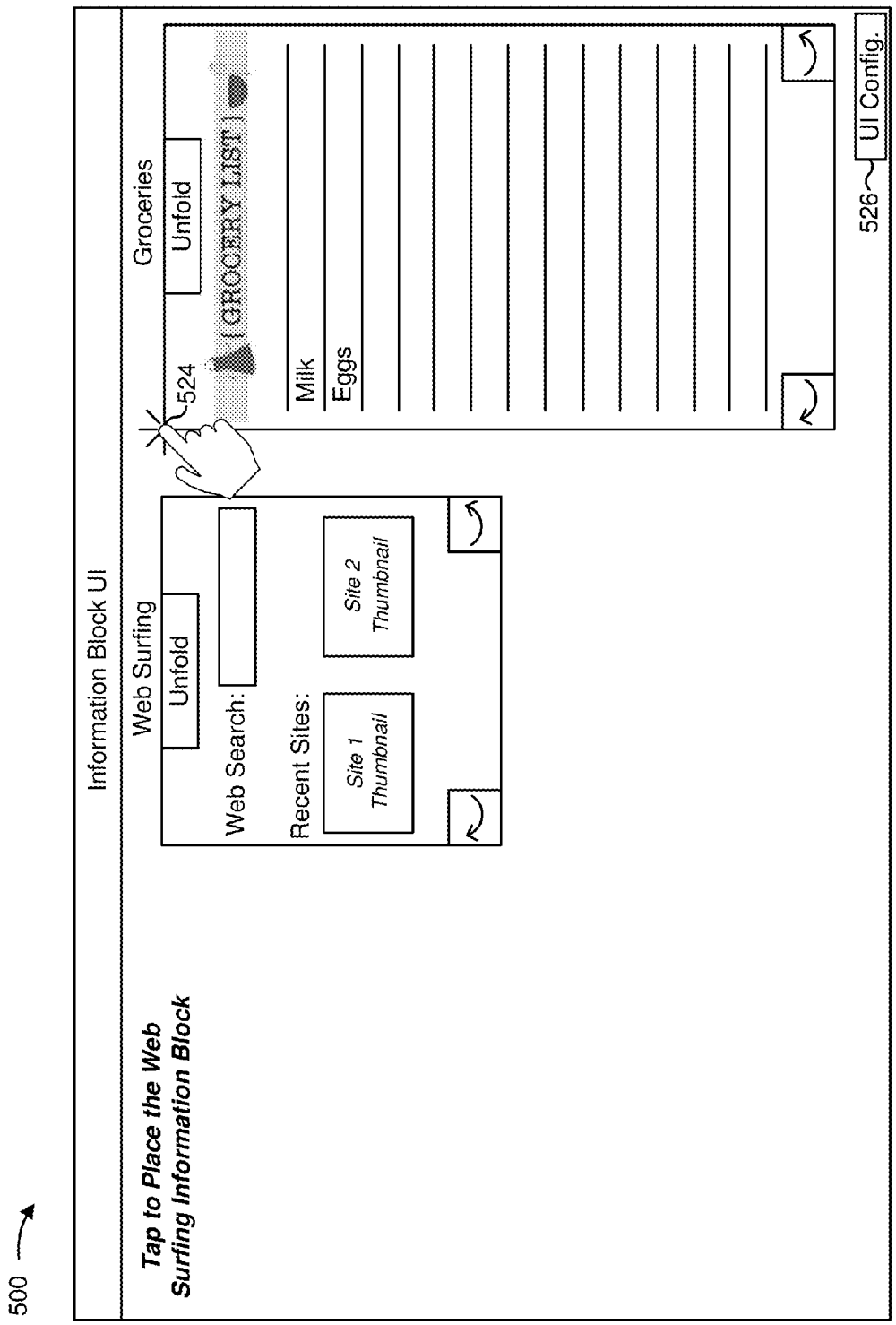

As shown in FIG. 5E, and by reference number 524, the user may identify (e.g., by tapping a display screen of user device 210) the location at which the user created information block is to be displayed within the information block user interface (e.g., a right side portion of the information block user interface). As shown by reference number 526, the user may indicate (e.g., by selecting the UI configuration button) that the user wishes to provide additional configuration information associated with the information block user interface.

Figure 5F:
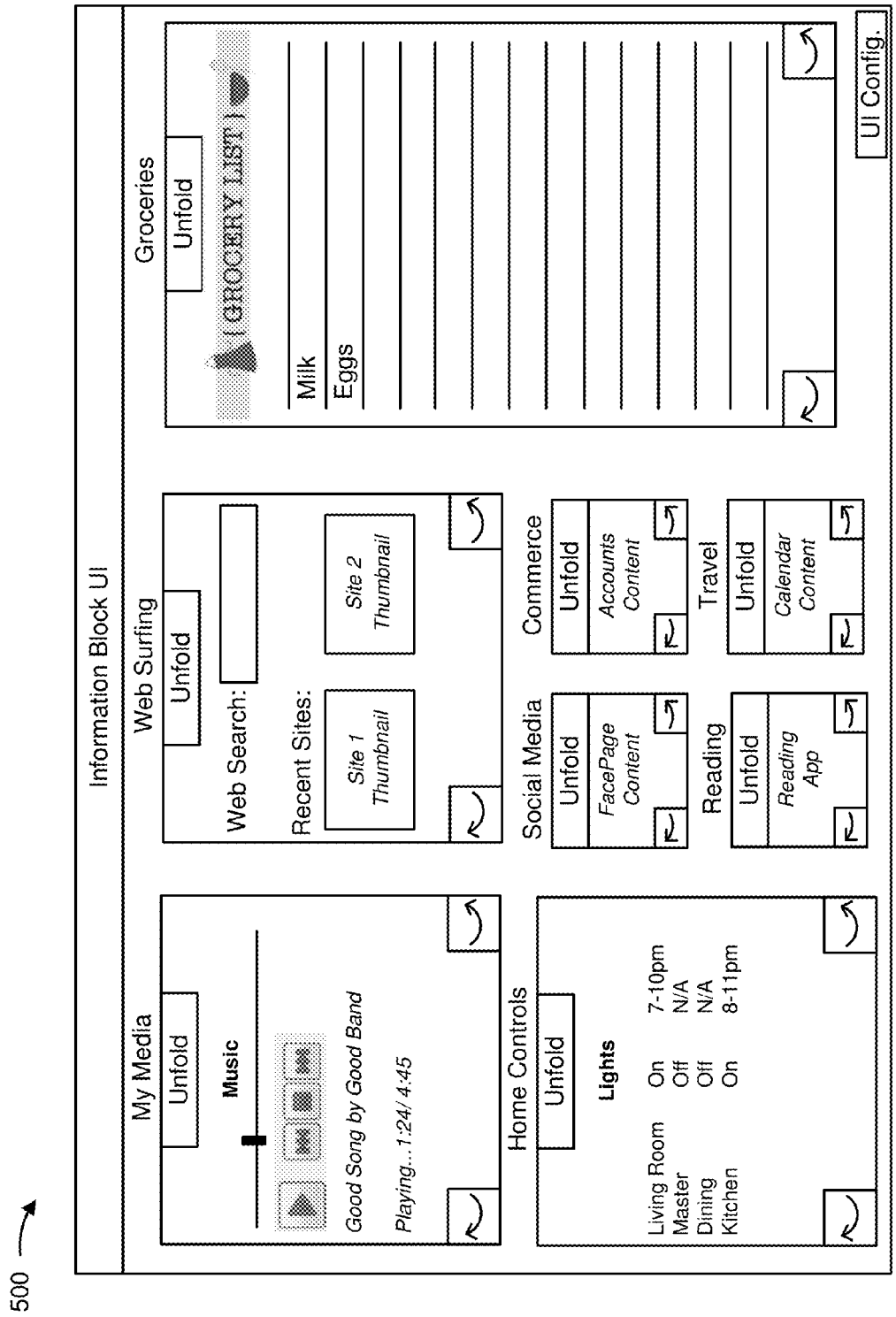

As shown in FIG. 5F, assume that user device 210 continues receiving (e.g., based on user input) configuration information in a similar manner until the configuration information describes a set of predefined information blocks (e.g., including the web surfing information block, a my media information block, a reading information block, and a travel information block) and a set of user created information blocks (e.g., including the grocery information block, a home controls information block, a social media information block, and a commerce information block). Here, user device 210 may store the configuration information associated with the information block user interface (e.g., such that user device 210 may provide the information block user interface for display at a later time).

As indicated above, FIGS. 5A-5F are provided merely as an example. Other examples are possible and may differ from what was described with regard to FIGS. 5A-5F.

Figure 6:
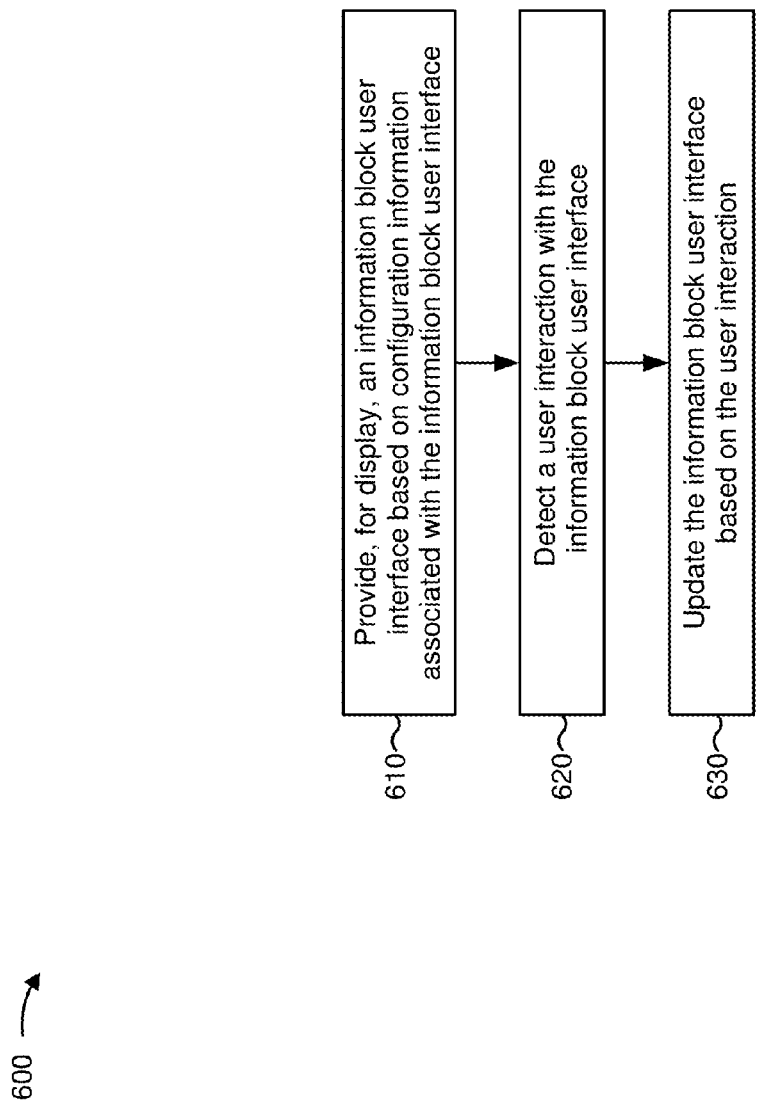
FIG. 6 is a flow chart of an example process for providing an information block user interface and updating the information block user interface based on a user interaction with the information block user interface.

FIG. 6 is a flow chart of an example process 600 for providing an information block user interface and updating the information block user interface based on a user interaction with the information block user interface. In some implementations, one or more process blocks of FIG. 6 may be performed by user device 210. In some implementations, one or more process blocks of FIG. 6 may be performed by another device or a set of devices separate from or including user device 210, such as server device 220.

As shown in FIG. 6, process 600 may include providing, for display, an information block user interface based on configuration information associated with the information block user interface (block 610). For example, user device 210 may provide, for display, an information block user interface based on configuration information associated with the information block user interface. In some implementations, user device 210 may provide the information block user interface for display when user device 210 receives an indication that user device 210 is to provide the information block user interface for display.

In some implementations, user device 210 may provide the information block user interface based on configuration information associated with the information block user interface. For example, user device 210 may store or have access to configuration information that describes the information block user interface, as described above. Here, user device 210 may provide the information block user interface for display based on the configuration information (e.g., such that each information block displays content in accordance with the configuration information, is displayed at a location identified by the configuration information, is displayed in a size identified by the configuration information, etc.).

In some implementations, user device 210 may provide the information block user interface for display when user device 210 receives an indication to display the information block user interface. For example, user device 210 may receive an indication to display the information block user interface when user device 210 powers on, when a user provides input (e.g., by selecting a button, by tapping a display screen of user device 210, etc.) indicating that user device 210 is to provide the information block user interface for display, or the like.

As further shown in FIG. 6, process 600 may include detecting a user interaction with the information block user interface (block 620). For example, user device 210 may detect a user interaction with the information block user interface. In some implementations, user device 210 may detect the user interaction with the information block user interface after user device 210 provides the information block user interface for display.

In some implementations, the user interaction may include a gesture associated with accessing content associated with an information block. For example, the user interaction may include a gesture associated with interacting with the information block user interface, such as a selection of an input element (e.g., a click of a button, a selection of a menu item, a click of an arrow, etc.), a provision of touch input (e.g., a left to right swipe, a double tap, etc.), or the like, associated with the information block. In some implementations, the user interaction may include a single gesture (e.g., a single click, a single swipe, etc.).

In some implementations, the user interaction may be associated with rotating the information block. For example, the user may select a rotate button, displayed on a panel of the information block, in order to indicate that user device 210 is to rotate the information block such that another panel, associated with the information block, is provided for display. As another example, the user may swipe from left to right across the displayed panel of the information block in order to indicate that user device 210 is to rotate the information block such that the other panel is provided for display. In this way, user device 210 may provide one-gesture access to non-displayed panels of the information block.

Additionally, or alternatively, the user interaction may be associated with unfolding an information block. For example, the user may select an unfold button, displayed on the panel of the information block, in order to indicate that user device 210 is to concurrently display multiple panels of the information block (e.g., in a row, in a column, etc.). In this way, user device 210 may provide concurrent access to one or more panels associated with an information block in response to a single gesture. In some implementations, one or more panels of the unfolded information block (e.g., one or more of the panels concurrently displayed after the unfolding of the information block) may include a rotatable panel that may be invoked and/or or rotated by the user (e.g., the one or more panels may be rotatable widget panels with which the user may further interact).

Similarly, the user interaction may be associated with refolding the information block (e.g., the user may indicated that user device 210 is to provide, for display, a refolded information block within the information block user interface after user device 210 provides the unfolded information block for display).

Additionally, or alternatively, the user interaction may be associated with expanding a display of an information block. For example, the user may double tap the panel associated with the information block, in order to indicate that user device 210 is to zoom in on the panel (e.g., such that the information block is displayed in a full screen view, a half screen view, etc.). Similarly, the user interaction may be associated with contracting the information block (e.g., the user may indicated that user device 210 is to zoom out from the information block).

As further shown in FIG. 6, process 600 may include updating the information block user interface based on the user interaction (block 630). For example, user device 210 may update the information block user interface based on the user interaction. In some implementations, user device 210 may update the information block user interface after user device 210 detects the user interaction.

In some implementations, user device 210 may update the information block user interface based on the user interaction and the configuration information. For example, assume that user device 210 detects a user interaction associated with a user selection of a rotate left button associated with a first panel of the information block. Here, user device 210 may determine, based on the configuration information, content that is configured to be displayed on a second panel (e.g., a panel to the left of the first panel) of the information block, and may update the information block user interface accordingly (e.g., such that content associated with the second panel is displayed rather than content associated with the first panel). In some implementations, user device 210 may automatically (e.g., without user interaction) execute the content (e.g., execute a gaming application, execute an application associated with a service, etc.), open the content (e.g., play a movie, open a PDF, etc.), or the like, based on updating the information block user interface. Continuing with the above example, user device 210 may update the information block user interface to include the content associated with the second panel of the information block. Here, if the second content is an application, user device 210 may automatically execute the application when user device 210 displays the second panel. In some implementations, the user may configure whether user device 210 is to automatically execute the content, open the content, or the like. In this way, user device 210 may provide efficient access to the content (e.g., the user may have access to the application based a single gesture).

As another example, assume that the user selects an unfold button associated with a first panel of the information block. Here, user device 210 may determine, based on the configuration information, content that is configured to be displayed on other panels associated with the information block (e.g., a second panel and a third panel), and may update the information block user interface accordingly (e.g., by concurrently displaying the first panel, the second panel, and the third panel in a full screen view).

As another example, assume that the user selects a reverse unfold button associated with a first panel of the information block (e.g., when the first panel is an outer panel of the information block). Here, user device 210 may determine, based on the configuration information, content that is configured to be displayed on inside panels of the information block, and may update the information block user interface accordingly. For example, as described above, the information block may include the first panel, the second panel, and the third panel (e.g., associated with outer surfaces of a hollow triangular prism). In some implementations, the information block may also include a fourth panel, a fifth panel, and a sixth panel (e.g., associated with inner surfaces of the hollow triangular prism). Here, if the user selects the reverse unfold button associated with the first panel, then user device 210 may update the information block user interface by concurrently displaying the fourth panel, the fifth panel, and the sixth panel (e.g., in a full screen view). Alternatively, user device 210 may update the information block user interface by concurrently displaying the first panel, the second panel, the third panel, the fourth panel, the fifth panel, and the sixth panel (e.g., in a full screen view).

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

FIGS. 7A-7E are diagrams of an example implementation 700 relating to example process 600 shown in FIG. 6. For the purposes of example implementation 700, assume that user device 210 powers on, determines (e.g., based on configuration information received and stored as described above with regard to example implementation 500) configuration information associated with an information block user interface, and provides, for display, the information block user interface in accordance with the configuration information.

Figure 7A:
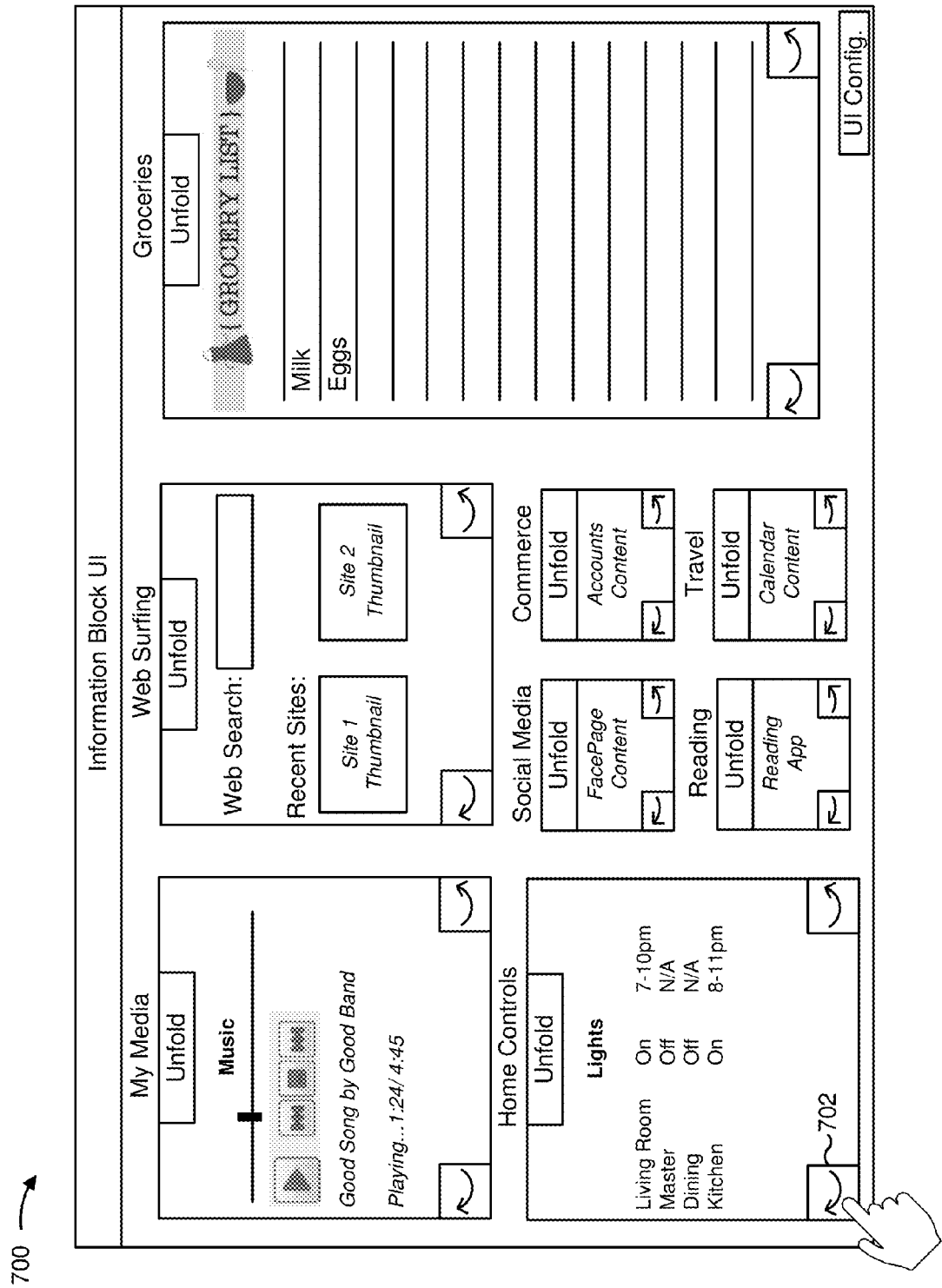
FIGS. 7A-7E are diagrams of an example implementation relating to the example process shown in FIG. 6.

As shown in FIG. 7A, and by reference number 702, user device 210 may detect a user interaction associated with a home controls information block displayed within the information block user interface. As shown, user device 210 may detect the user interaction based on the user selecting a rotate left button associated with a first panel (e.g., a lights panel) of the home controls block.

Figure 7B:
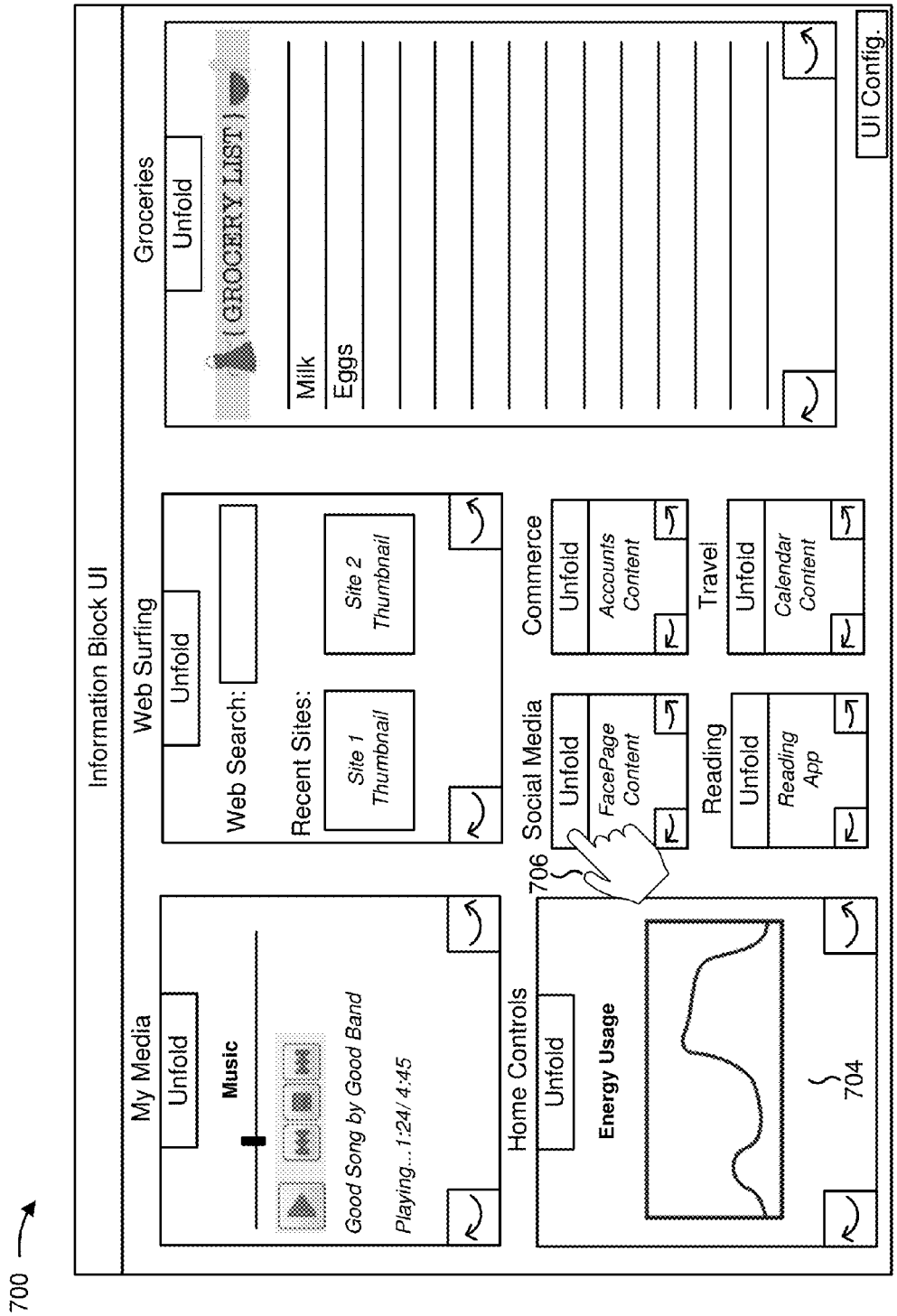

As shown in FIG. 7B, and by reference number 704, user device 210 may update the information block user interface based on the user interaction associated with the home controls information block. As shown, user device 210 may update the information block user interface to display a second panel (e.g., an energy usage panel) of the home controls information block (e.g., assume that the home controls information block includes three panels: the lights panel, the energy usage panel, and a temperature panel). Here, user device 210 may update the information block user interface based on the configuration information. Notably, each non-displayed panel of the home controls information block may be accessed in one gesture at any time (e.g., when rotating left from the lights panel causes the energy usage panel to be displayed and rotating right from the lights panel causes the temperature panel to be displayed, when rotating left from the energy usage panel causes the temperature panel to be displayed and rotating right from the energy usage panel causes the lights panel to be displayed, and when rotating left from the temperature panel causes the lights panel to be displayed and rotating right from the temperature panel causes the energy usage panel to be displayed). Other information blocks of the information block user interface may behave in a similar manner to that of the home controls information block.

As shown by reference number 706, user device 210 may detect a user interaction associated with a social media information block displayed within the information block user interface. As shown, user device 210 may detect the user interaction based on the user selecting an unfold button associated with a first panel (e.g., a FacePage panel) of the social media information block.

Figure 7C:
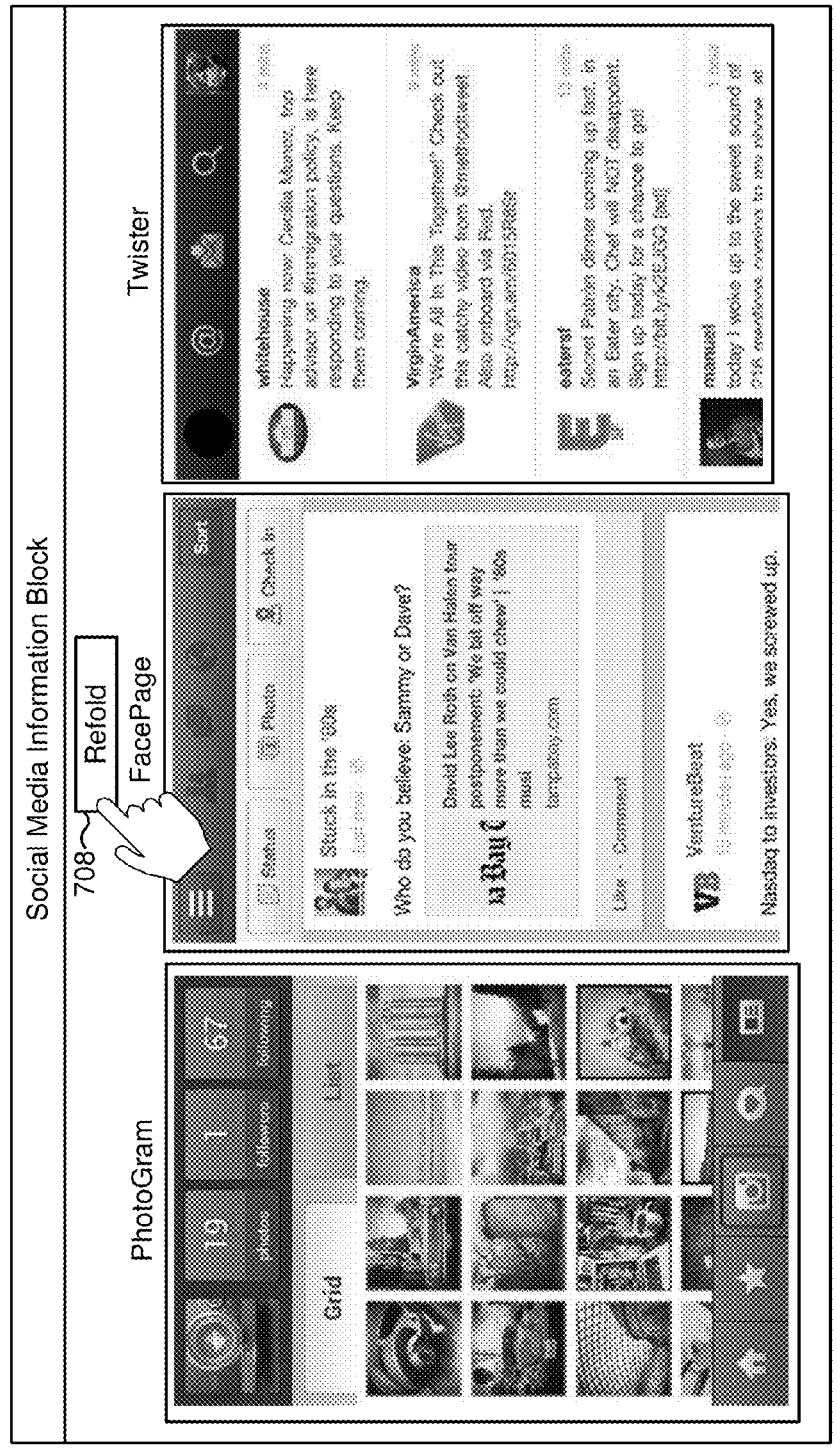

As shown in FIG. 7C, user device 210 may update the information block user interface based on the user interaction associated with the social media information block. As shown, user device 210 may update the information block user interface to concurrently display the first panel (e.g., the Facepage panel), a second panel (e.g., an PhotoGram panel), and a third panel (e.g., a Twister panel) associated with the social media information block (e.g., assume that the social media information block includes three panels: the FacePage panel, the PhotoGram panel, and the Twister panel). Here, user device 210 may update the information block user interface based on the configuration information associated with the three social media information block panels. Notably, each panel of the social media information block is accessible in one gesture (e.g., since unfolding the panel causes the three panels to be concurrently displayed). Other information blocks of the information block user interface may behave in a similar manner to that of the social media information block. As shown by reference number 708, the user may indicate (e.g., by selecting a Refold button), that the social media information block is to be refolded (e.g., such that the set of information blocks is re-displayed)

Figure 7D:
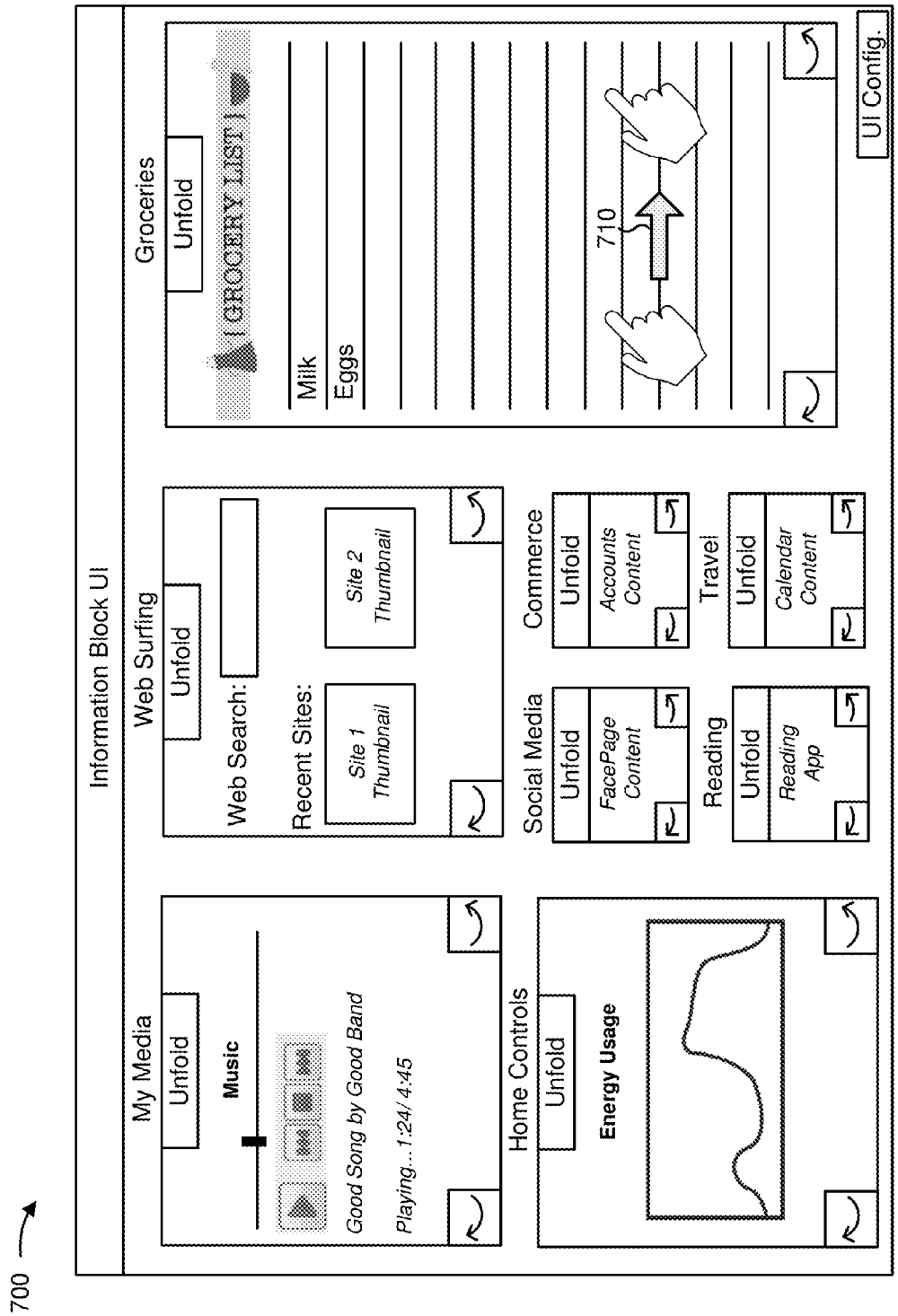

As shown in FIG. 7D, and by reference number 710, user device 210 may detect a user interaction associated with a groceries information block displayed within the information block user interface. As shown, user device 210 may detect the user interaction based on the user swiping from left to right across a grocery list panel of the groceries information block (e.g., to indicate that the groceries information block is to be rotated right).

Figure 7E:
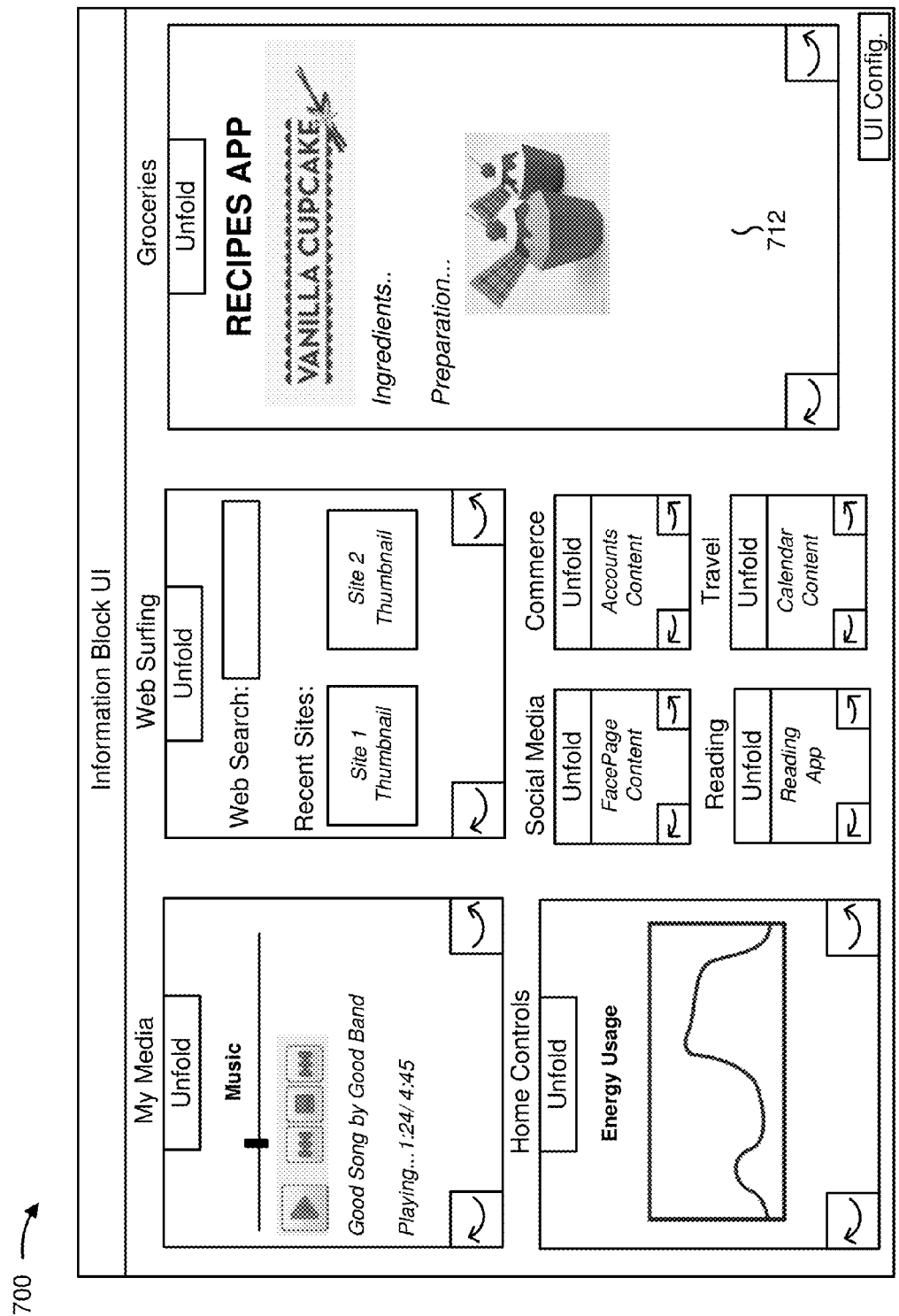

As shown in FIG. 7E, and by reference number 712, user device 210 may update the information block user interface based on the user interaction associated with the groceries information block. As shown, user device 210 may update the information block user interface to display a second panel (e.g., a recipes application panel) of the groceries information block (e.g., assume that the groceries information block includes three panels: the grocery list panel, the recipes application panel, and a coupons application panel). Here, user device 210 may update the information block user interface based on the configuration information. Notably, each non-displayed panel of the groceries information block may be accessed in one gesture at any time (e.g., when swiping from left to right on the grocery list panel causes the recipes application panel to be displayed and swiping from right to left on the grocery list panel causes the coupons application panel to be displayed, when swiping from left to right on the recipes application panel causes the coupons application panel to be displayed and swiping from right to left on the recipes application panel causes the grocery list application panel to be displayed, and when swiping from left to right on the coupons application panel causes the grocery list application panel to be displayed and swiping from right to left on the coupons application panel causes the recipes application panel to be displayed). Other information blocks of the information block user interface may behave in a similar manner to that of the groceries information block.

As indicated above, FIGS. 7A-7E are provided merely as an example. Other examples are possible and may differ from what was described with regard to FIGS. 7A-7E.

Implementations described herein may provide a configurable user interface that includes one or more information blocks designed to efficiently provide a user with access to content associated with the user device (e.g., such that the user may access the content in one gesture or less, such that a user experience associated with accessing the content is unified across the content).

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Certain user interfaces have been described herein and/or shown in the figures. A user interface may include a graphical user interface, a non-graphical user interface, a text-based user interface, etc. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

To the extent the aforementioned embodiments collect, store, or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "group" and "set" are intended to include one or more items (e.g., related items, unrelated items, a combination of related items and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
    a memory; and
    one or more processors to:
        provide, for display, an information block user interface that includes an information block,
        the information block comprising:
            a first panel, a second panel, and a third panel associated with an outer surface of an object,
            a fourth panel, a fifth panel, and a sixth panel associated with an inner surface of the object,
            the fourth panel being provided on an opposing side of the first panel,
            the fifth panel being provided on an opposing side of the second panel, and
            the sixth panel being provided on an opposing side of the third panel;
        detect a user interaction that includes a user selection of a button associated with the first panel, the second panel, or the third panel of the information block; and
        provide, for display and based on the user selection of the button, an updated information block user interface that includes the fourth panel, the fifth panel, and the sixth panel.

2. The device of claim 1, where the one or more processors are further to:
    receive configuration information associated with the information block,
        the configuration information being based on user input; and
    where the one or more processors, when providing, for display, the information block user interface that includes the information block, are to:
        provide the information block user interface for display based on the configuration information.

3. The device of claim 2, where the configuration information includes location information associated with the information block,
    the location information identifying portions of a display screen in which the first panel, the second panel, and the third panel are to be displayed; and
    where the one or more processors, when providing, for display, the information block user interface that includes the information block, are to:
        provide the information block user interface for display based on the location information.

4. The device of claim 2, where the information block includes a first information block and a second information block,
    where the configuration information includes size information associated with the information block,
        the size information identifying a first size for the first information block and a second size for the second information block,
        the first size being different from the second size; and
    where the one or more processors, when providing, for display, the information block user interface that includes the information block, are to:
        provide the first information block and the second information block for display based on the size information.

5. The device of claim 1, where the one or more processors, when providing, for display and based on the user interaction, the updated information block user interface that includes the fourth panel, the fifth panel, and the sixth panel, are further to:
    automatically execute at least one item of content associated with the fourth panel, the fifth panel, or the sixth panel based on the user interaction.

6. The device of claim 1, where the one or more processors are further to:
    concurrently display the fourth panel, the fifth panel, and the sixth panel in a full screen view.

7. The device of claim 1, where the one or more processors are further to:
    detect another user interaction associated with the fourth panel, the fifth panel, or the sixth panel of the updated information block user interface; and
    provide, for display and based on the other user interaction, another updated information block user interface that includes the first panel, the second panel, and the third panel.

8. A computer-readable medium storing instructions, the instructions comprising:
    one or more instructions that, when executed by one or more processors, cause the one or more processors to:

provide, for display, a user interface that includes an information block,
   the information block comprising a first panel, a second panel, and a third panel associated with an outer surface of an object,
   a fourth panel, a fifth panel, and a sixth panel associated with an inner surface of the object,
   the fourth panel being provided on an opposing side of the first panel,
   the fifth panel being provided on an opposing side of the second panel, and
   the sixth panel being provided on an opposing side of the third panel;
identify a user interaction that includes a user selection of a button associated with the first panel, the second panel, or the third panel; and
provide, for display and based on the user interaction, an updated user interface that includes the fourth panel, the fifth panel, and the sixth panel.

9. The computer-readable medium of claim 8, where the one or more instructions, when executed by the one or more processors, further cause the one or more processors to:
receive configuration information associated with the information block,
   the configuration information being based on user input; and
where the one or more instructions, that cause the one or more processors to provide, for display, the user interface that includes the information block, cause the one or more processors to:
   provide, for display, the user interface that includes the information block based on the configuration information.

10. The computer-readable medium of claim 9, where the configuration information includes location information associated with the information block,
the location information identifying areas of a display screen in which the first panel, the second panel, and the third panel are to be displayed; and
where the one or more instructions, that cause the one or more processors to provide, for display, the user interface that includes the information block, cause the one or more processors to:
   provide, for display, the user interface that includes the information block based on the location information.

11. The computer-readable medium of claim 9, where the user interface includes a first information block and a second information block,
where the configuration information includes size information associated with the first information block and the second information block,
   the size information identifying a first size for the first information block and a second size for the second information block,
   the first size being different from the second size; and
where the one or more instructions, that cause the one or more processors to provide, for display, the user interface that includes the information block, cause the one or more processors to:
   provide the first information block and the second information block for display based on the size information.

12. The computer-readable medium of claim 8, where the one or more instructions, that cause the one or more processors to provide, for display and based on the user interaction, the updated user interface that includes the fourth panel, the fifth panel, and the sixth panel, cause the one or more processors to:
automatically load an item of content associated with the fourth panel, the fifth panel, or the sixth panel based on the user interaction.

13. The computer-readable medium of claim 8, where the one or more instructions, when executed by the one or more processors, further cause the one or more processors to:
concurrently display the fourth panel, the fifth panel, and the sixth panel in a full screen view.

14. The computer-readable medium of claim 8, where the one or more instructions, when executed by the one or more processors, further cause the one or more processors to:
detect another user interaction associated with the fourth panel, the fifth panel, or the sixth panel of the updated user interface; and
provide, for display and based on the other user interaction, another updated user interface that includes the first panel, the second panel, and the third panel.

15. A method, comprising:
determining, by a device and based on user input, configuration information associated with an information block,
   the information block comprising a first panel, a second panel, and a third panel associated with an outer surface of an object,
   a fourth panel, a fifth panel, and a sixth panel associated with an inner surface of the object,
   the fourth panel being provided on an opposing side of the first panel,
   the fifth panel being provided on an opposing side of the second panel, and
   the sixth panel being provided on an opposing side of the third panel;
causing, by the device, a user interface, that includes the information block, to be displayed;
detecting, by the device, a user interaction that includes a user selection of a button associated with the first panel, the second panel, or the third panel; and
causing, by the device and based on the user selection of the button, an updated user interface, that includes the fourth panel, the fifth panel, and the sixth panel, to be displayed.

16. The method of claim 15, where the configuration information includes location information associated with the information block,
the location information identifying portions of a display screen in which the first panel, the second panel, and the third panel are to be displayed; and
where causing the user interface, that includes the information block, to be displayed comprises:
   causing the information block to be displayed based on the location information.

17. The method of claim 15,
where the user interface includes a first information block and a second information block,
where the configuration information includes size information associated with the first information block and the second information block,
   the size information identifying a first size for the first information block and a second size for the second information block,
   the first size being different from the second size; and
where causing the user interface, that includes the information block, to be displayed comprises:

causing the first information block and the second information block to be displayed based on the size information.

18. The method of claim 15, where causing the updated user interface, that includes the fourth panel, the fifth panel, and the sixth panel, to be displayed comprises:
automatically opening at least one item of content associated with the fourth panel, the fifth panel, or the sixth panel based on the user interaction.

19. The method of claim 15, further comprising:
concurrently displaying the fourth panel, the fifth panel, and the sixth panel in a full screen view.

20. The method of claim 15, further comprising
detecting another user interaction associated with the fourth panel, the fifth panel, or the sixth panel of the updated user interface; and
providing, for display and based on the other user interaction, another updated user interface that includes the first panel, the second panel, and the third panel.

\* \* \* \* \*